Feb. 24, 1953 R. P. HAMMOND ET AL 2,629,459
FILTER
Filed March 27, 1950
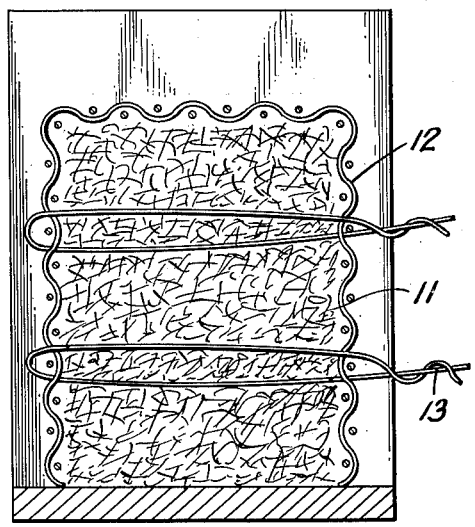
INVENTORS
R. PHILIP HAMMOND AND
JOSEPH A. LEARY
BY *Roland A. Anderson*
ATTORNEY Patented Feb. 24, 1953

2,629,459

UNITED STATES PATENT OFFICE 2,629,459

FILTER

R. Philip Hammond and Joseph A. Leary, Los Alamos, N. Mex., assignors to the United States of America as represented by the United States Atomic Energy Commission Application March 27, 1950, Serial No. 152,184

2 Claims. (Cl. 183—45)

This invention relates to the removing of suspended matter from gases, and particularly to the decontamination of radioactive aerosols.

A variety of materials become suspended in air or other gases, such as exit gases from furnaces or chemical processes; removal of these suspended materials is usually desirable and frequently necessary. The elimination of industrial fumes, dusts, mists and smokes is especially desirable to avoid smog and the like.

The behavior of suspended particles, whether liquid or solid, is in large part a function of their size. Particles above about 10 microns in size tend to settle rather rapidly, and are easily removed by gravitational, inertial or centrifugal forces in separating devices such as settling chambers, baffle chambers, cyclone separators or the like. Particles smaller than about 10 microns in size do not settle so rapidly, and are readily carried about by air or other gas currents. Separating devices such as dry filters, wet scrubbers or electrostatic precipitators are required to remove such particles from gas streams. When it is important to remove substantially all suspended material from a gas stream, as in the case of radioactive contamination where radiation hazards must be minimized, both small and large particles must be removed, and filters, scrubbers, precipitators or the like are therefore required.

Wet methods enjoy certain advantages over dry methods, especially with regard to operation and maintenance of the apparatus. While the dry filter element must in general be changed by hand when the amount of dust collected has caused a certain increase in air resistance, the extent of solids buildup in the circulating water of a wet air cleaner may easily be controlled by regulation of the rate of blow-down. Inasmuch as exposure of personnel to radiation must be held within safe limits, it may become necessary to change a highly contaminated filter element long before dust buildup has begun to affect filter performance. Further, the disposal of a contaminated filter presents problems. If the filter is burned to reduce the bulk of contaminated material to be handled, new problems of dust collection and disposal arise. On the other hand, the contaminated effluent from wet-type equipment may readily and easily be transferred to final disposal by pumping under remote control to underground storage tanks. In addition, wet systems are often more simple to construct and to protect against corrosion.

There are drawbacks, however, to the use of wet collection systems. Dry systems such as paper filters or electrostatic collectors are known to remove smaller particles than do conventional wet systems. If an appreciable proportion by weight of the suspended matter to be removed is of a size not removed by conventional wet collection equipment, then the use of such equipment will not give an acceptable degree of particle removal. Further, in the case of wet systems, entrainment, or the carrying of liquid particles beyond the end of the equipment, may return to the gas stream some of the material removed by the collection system and thus reduce the effectiveness of the system.

Entrainment difficulties are reduced by providing space in which the droplets may leave the gas stream. The disengaging space is in some ways comparable to a settling chamber. An entrainment eliminator, also, is frequently employed. Such an eliminator usually comprises a second collection stage of a type suitable for removing larger particles, for example, zig-zag baffle plates.

A wet collection system is thus, in practice, a multiple stage apparatus. The first stages effect contact between the gas to be cleansed and the liquid of the system, thus removing the larger particles from the gas. Succeeding stages free the cleansed gas stream of particles of entrained liquid cleansing medium, so that evaporation of the liquid in the droplets shall not restore contaminant particles to the gas stream.

It is therefore an object of this invention to provide a wet method and apparatus for the more effective removal of suspended matter from gases.

It is another object of this invention to provide an improved wet method and apparatus for removing relatively small suspended particles from a gas.

Another object of this invention is to provide an effective method and apparatus for the decontamination of radioactive aerosols.

These and other objects are achieved, according to this invention, by causing the air or other gas stream being cleansed to come into intimate contact with water or other volatile liquid so as to increase the vapor content of the gas stream; removing entrained droplets, if desired; and then passing the vapor-enriched gas stream through a third element, comprising a labyrinth of interconnected apertures, said apertures being larger than the particles to be removed by a factor of between about a few times and about a few hundred times.

It has been found that the addition of such an element, e. g., a pad of small diameter fibers, loosely packed in essentially random orientation, to the exit side of conventional wet-scrubbers, for example, cascade or baffle plate scrubbers, air washers, or capillary air washers such as those described in U. S. Patents 2,054,809 and 2,149,593, appreciably increases the over-all effectiveness of the particular collection system.

It has also been found that the fibrous pads of this invention function in a manner clearly distinct from that of either dry fibrous filters or the fibrous cells of the capillary air washers, and also clearly distinct from the mode of operation of entrainment separators.

A preferred embodiment of this third element is a fibrous pad, as shown in the drawing, made up of filaments 11 of small diameter and of length great in proportion to diameter, said filaments being very loosely packed in essentially random orientation. The filaments, preferably of a material not affected by the liquid in question, are maintained in position by, for example, an outer shell of metal screening 12 together with occasional loops of wire 13 passing from one side of the pad to the other and engaging the screen. For convenience and economy, such materials as fine glass or stainless steel fibers may be employed. The loosely packed pad, which would appear to offer resistance to the passage only of very large particles, does in fact, in co-operation with the vapor-enriching element, effect removal of very small particles, for example, particles even less than one micron in diameter. While this third element may also serve to replace or supplement the entrainment eliminator, the inclusion of an eliminator as a second element is in most cases desirable.

It is preferred to carry the vapor-enrichment process to the point where the gas stream is saturated with the vapor in question, for better operation is thus achieved. Indeed, it has been found possible to increase the efficiency of collection by operating the process of this invention in such a fashion as to produce super-saturation and consequent condensation of the enriching vapor, a technique which may be used to advantage entirely apart from the technique of employing the third element of this invention. One method for achieving supersaturation comprises holding one zone of the gas-liquid contacting portion of an apparatus in question at a temperature below that of a preceding zone in which saturation of the gas with vapor is at least approached, or preferably achieved. Such a temperature difference is effected by supplying heat to the warmer zone and/or removing heat from the cooler zone, conveniently by heat transfer means operated by a heat pump.

In another embodiment of the process especially suited to producing super-saturation, vapor may be supplied directly to some upstream zone of the apparatus, that is, some zone before the final zone.

A variety of ways of applying the several aspects of the method of this invention will be apparent to those skilled in the art, and the embodiments and examples which are given are to be considered as being by way of illustration only.

In the following example of the operation of the process of this invention there are illustrated improvements in collection efficiency which have been achieved.

Example I

Three conventional baffle plate scrubbers employing recirculated water in each scrubber, and equipped with zig-zag entrainment eliminators, are operated in series to remove suspended radioactive particles from an air stream. The radioactive nature of the suspended matter enables ready estimation of the amount of matter suspended in the gas stream at any point of the system. At linear velocities of about 200 feet per minute, the air stream is, on the average, freed of 83 per cent by weight of the suspended material. When a 2 inch thick pad, made up of glass fibers approximately 0.00035 inch in diameter packed to a density of about 0.4 pound per cubic foot, is placed on the exit side of the entrainment eliminator in each scrubber tower, the average overall efficiency of removal is increased to 99.7 per cent, and the size of the largest particles passing entirely through the system is decreased from about 2 microns to about 1 micron. The pressure drop through the device even at the relatively high air velocity of 200 linear feet per minute amounts to only about one-half to one inch of water per tower. When the pads are inserted, the pressure drop is approximately double, but still remains at a level well within the capacity of conventional blowers; special blowers are not required. The pad recited above may have fibers generally about 0.0004 inch in diameter packed to a density of 0.1 pound per cubic foot to about 0.6 pound per cubic foot.

The example given below is an experiment which was made to show whether the collection improvement illustrated in Example I was due merely to an improvement in entrainment elimination.

Example II

The apparatus of Example I, without pads, is operated with very heavily contaminated water, and then is thoroughly cleaned and is operated using clean, uncontaminated water. The extent of contamination of the water in the first instance is very great compared to the contamination of the air being cleaned, so that any entrainment would lead to very low values for efficiency, because so little as one droplet passing back into the air stream would restore an appreciable amount of contamination to the air. No significant difference in efficiency is noted between the two runs, indicating that entrainment is being eliminated satisfactorily by the zig-zag baffles, and that the contribution made by the pads of Example I is not merely to decrease entrainment.

The following two examples deal with experiments showing that the manner in which the cells of a capillary air washer operate differs from the manner of operation of the pads of this invention.

Example III

A particular capillary air washer contains, in series, two cells, comprising relatively coarse fibers of glass in substantially parallel orientation. These cells are so disposed that each can be wetted continuously by a spray of recirculated water. The washer is operated first with both cells being so wetted, and then with only the first cell receiving a water spray, leaving the second cell to operate under conditions similar to those obtaining for the fibrous pads of Example I. A decrease in efficiency of particle collection is noted when the spray on the second cell is turned off. If this cell were capable of acting as did the pads of Example I, then no decrease or even an increase in efficiency might have been expected.

*Example IV*

Another capillary air washer with three cells is operated, first in the usual manner, and then with the third cell replaced by a fibrous pad, the pad being used without the water spray. A marked increase in efficiency is noted when the pad is used showing that the fibrous pad operates in a manner different by an order of magnitude from the mode of operation of the cell of the air washer. When the third cell of this air washer is used without the water spray, the over-all efficiency of the device is even lower than when sprays are used with all three cells. In addition, the size of the largest particles passing through the collection system is reduced by a factor of about two or more when the fibrous pad of this invention is used in place of the third cell of the capillary air washer.

The following example is given to illustrate the improvement in efficiency of collection made possible by increasing the degree of enrichment of the gas stream with vapor.

*Example V*

The three-tower cascade scrubber of Example I is operated with the recirculating water in at least one tower at a temperature between about 1° F. and about 25° F. above the temperature of the water in at least one succeeding stage. A preferred temperature differential per stage is of the order of 3° F. to 5° F. In comparison with the results obtained in Example I, the proportion by weight of suspended matter passing entirely through the system is reduced by a factor of about three. This factor of improvement due to the increased degree of vapor enrichment is not markedly affected by the presence or absence of the fibrous pads, although the over-all efficiency of the system of this example or of Example I is markedly improved by the addition of the pads.

The following example illustrates the cooperation which occurs between the third element of this invention, and the preceding elements, and also shows that the pads of this invention do not operate as do dry fibrous filters.

*Example VI*

One of the fibrous pads of Example I is placed in the air stream ahead of the baffle plate scrubbers of the same example, and the concentration of suspended matter in the air stream on either side of the dry pad is determined. No significant decrease in suspended matter is noted, indicating that this fibrous pad is not effective when operated as a dry filter, but rather only when employed in cooperation with the vapor-enriching element.

As many other embodiments employing the method of this invention without departing from the scope and spirit thereof will be obvious to those skilled in the art, the invention is not to be limited in scope except as indicated in the appended claims.

What is claimed is:

1. A filter for removing particulate matter from a gas stream saturated with vapor comprising a pad of glass fibers, said fibers being about 0.0004 inch in diameter and being packed in essentially random orientation to a bulk density of between about 0.1 and about 0.6 pound per cubic foot.

2. A filter for removing particulate matter from a gas stream saturated with vapor comprising a pad of glass fibers, said fibers being about 0.00035 inch in diameter and being packed in essentially random orientation to a bulk density of about 0.4 pound per cubic foot.

R. PHILIP HAMMOND.
JOSEPH A. LEARY.

REFERENCES CITED

The following references are of record in the file of this patent:

UNITED STATES PATENTS

| Number | Name | Date |
|---|---|---|
| 1,099,773 | Smith | June 9, 1914 |
| 1,243,472 | Wilson | Oct. 16, 1917 |
| 1,395,833 | Kling et al. | Nov. 1, 1921 |
| 1,497,367 | Frese | June 10, 1924 |
| 1,670,660 | Haase et al. | May 26, 1928 |
| 1,838,512 | Wilson | Dec. 29, 1931 |
| 2,083,132 | Williams et al. | June 8, 1937 |
| 2,095,539 | Bichowsky | Oct. 12, 1937 |
| 2,117,371 | Slayter | May 17, 1938 |
| 2,143,015 | Kleinschmidt | Jan. 10, 1939 |
| 2,307,292 | Palmer | Jan. 5, 1943 |
| 2,383,066 | McDermott | Aug. 21, 1945 |

FOREIGN PATENTS

| Number | Country | Date |
|---|---|---|
| 358,101 | Great Britain | Oct. 5, 1931 |
| 542,020 | Great Britain | Dec. 22, 1941 |